United States Patent

[11] 3,548,988

| [72] | Inventor | Jack W. Armstrong |
| --- | --- | --- |
| | | Baldwinsville, N.Y. |
| [21] | Appl. No. | 805,479 |
| [22] | Filed | Mar. 10, 1969 |
| [45] | Patented | Dec. 22, 1970 |
| [73] | Assignee | Lipe Rollway Corporation |
| | | Liverpool, N.Y. |
| | | a corporation of New York |

[54] FRICTION CLUTCH PRESSURE PLATE
6 Claims, 2 Drawing Figs.

[52] U.S. Cl. ............................................. 192/107, 192/70.15
[51] Int. Cl. ....................................................... F16d 13/60, F16d 13/66
[50] Field of Search ........................................... 192/107, 70.14, 70.15

[56] References Cited
UNITED STATES PATENTS

| 559,558 | 5/1896 | Worrall et al. ................ | 192/70.15 |
| 1,049,604 | 1/1913 | Rosewarne .................... | 192/70.15 |
| 2,154,117 | 4/1939 | Wolfram ....................... | 192/70.14 |

Primary Examiner—Benjamin W. Wyche
Attorney—Cumpston, Shaw and Stephens

ABSTRACT: The pressure plate of a friction clutch has a conic surface formed around its periphery to incline rearwardly relative to the engaging direction of the pressure plate. The angle between the plane, inner surface of the pressure plate and the conic outer surface preferably subtends from 0.030 of an inch to 0.400 of an inch at the periphery of the pressure plate, and the conic surface preferably extends inward at least one-quarter of the way from the periphery.

PATENTED DEC22 1970

3,548,988

INVENTOR.
JACK W. ARMSTRONG
BY Cumpston, Shaw and Stephens
ATTORNEYS

FRICTION CLUTCH PRESSURE PLATE

THE INVENTIVE IMPROVEMENT

Friction clutches used with automotive engines for the power trains of automobiles and trucks have used pressure plates of gray cast iron having flat, pressure faces perpendicular to the axis of the clutch. It was impractical to make such cast iron pressure plates with tensile strength of over 40,000 p.s.i., and yet the increasing speed of modern engines has demanded higher tensile strength for clutch components to ensure against breaking or bursting of the clutch at high speeds. To meet this need, nodular iron pressure plates with tensile strengths of 80,000 to 120,000 p.s.i. are being used to ensure against bursting at any possible operating speed.

The nodular iron pressure plates now preferred in automotive clutches wear out the friction material in the clutch unevenly and more quickly than the gray cast iron pressure plates. This uneven wear also results in uneven torque. The invention involves discovering the reason for this faster wear rate and uneven torque, and proposing an expedient that substantially increases the wear life of the friction material and produces more uniform torque in clutches having pressure plates formed of nodular iron, steel, or other metals stronger than gray cast iron. The invention departs from the normally flat pressure face of the pressure plate, to a shaped pressure face, and includes a specific pressure face shape that has been proven to extend the wear life of clutches having nodular iron pressure plates.

SUMMARY OF THE INVENTION

According to the invention it was discovered that high tensile strength pressure plates of nodular iron, steel, and the like, warp in use under heat and pressure to form a dished or concave configuration that wears the outermost friction material at an excessive rate. The amount of this warpage was measured in the experiments leading to the invention. After this discovery it was suggested that the pressure face of the pressure plate be shaped in a specific way to wear the friction material more evenly, and tests were made to confirm that such a shaping increased the wear life and produced more uniform torque. This successful shaping of the pressure face involved forming a conic surface around the outer edge to extend inward from the outer edge at least one-quarter of the way toward the inner edge and to incline rearwardly relative to the engaging direction of the pressure plate. The pressure face inside the conic surface was retained as a plane surface extending from the inner edge outward at least one-third of the way to the outer edge. The angle between the plane surface and the conic surface subtends 0.030 inch to 0.400 inch at the outer edge, and for nodular iron this angle preferably subtends approximately 0.100 inches at the outer edge. The respective widths of the plane and conic surface and the angle between them are preferably selected to fit the warping of the particular metal of the pressure plate.

The first few engagements with such a shaped pressure plate produce lower friction than usual, but the pressure plate quickly wears in, warps, and increases the friction. The ridge or juncture between the plane surface and the conic surface wears off somewhat, and as the pressure plate warps, a fairly even balance is struck between the plane surface and the conic surface for wearing away the same volume of inner and outer friction material approximately as previously obtained with gray cast iron pressure plates. At the same time the inventive solution is simple and inexpensive — requiring only a simple cut on a lathe.

DRAWINGS

FIG. 1 is an elevational view of the pressure face of the inventive friction clutch pressure plate; and FIG. 2 is a cross section of the pressure plate of FIG. 1 taken along line 2–2 thereof.

DETAILED DESCRIPTION

The inventive friction clutch pressure plate was developed for the automotive industry and particularly for use in trucks. However, its use is not limited to trucks, and the invention can meet similar clutch problems in other power trains. The drawings show only the pressure plate for the inventive clutch since the remainder of the clutch is known or conventional. Various clutches differing in may particulars can use the inventive pressure plate as illustrated and described.

Figure 1:
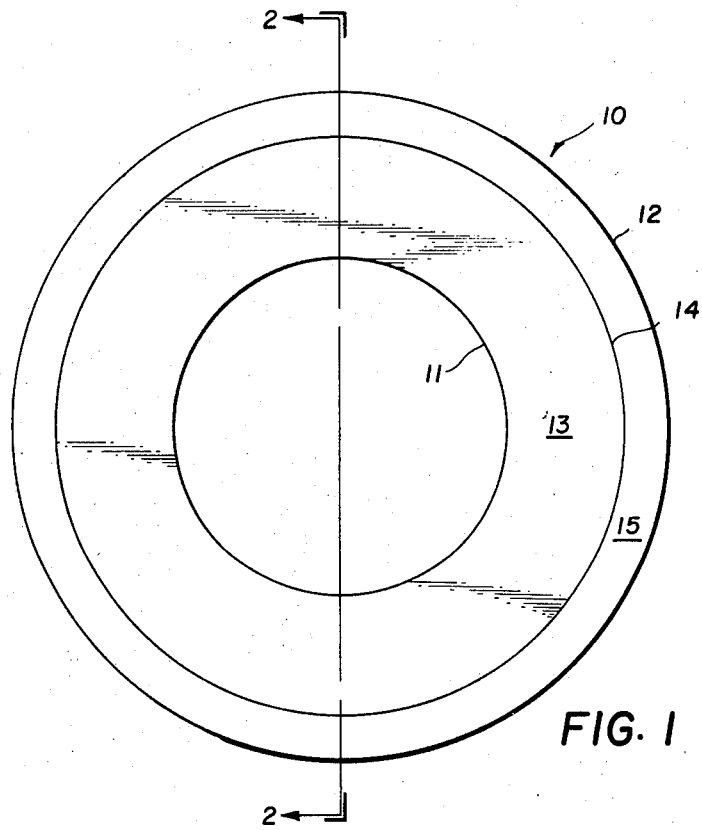
Figure 2:
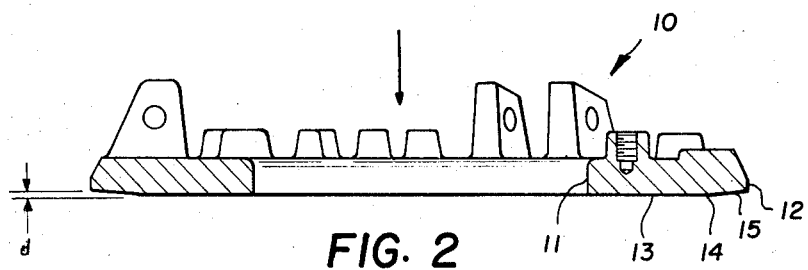

Pressure plate 10 has an annular shape as illustrated with inner edge 11 and an outer edge 12. The inner working face 13 of pressure plate 10 is plane and perpendicular to the axis of pressure plate 10 from inner edge 11 outward at least one-third of the way toward outer edge 12. A ridge or line 14 marks the outer periphery of plane inner face 13. A conic surface 15 extends outwardly from line 14 to outer edge 12 and is inclined rearwardly relative to the engaging direction of pressure plate 10 as shown by the arrow in FIG. 2. Conic surface 15 extends inwardly from outer edge 12 to at least one-quarter of the way toward inner edge 11.

Conic surface 15 is nearly flat and forms a small angle relative to plane face 13. The angle between plane face 13 and conic surface 15 subtends a distance at outer edge 12 that is preferably from 0.030 inch to 0.400 inch and for nodular iron is preferably approximately 0.100 inch. Also conic surface 15 preferably extends inwardly one-third of the way from outer edge 12 to inner edge 11. Pressure plate 10 is preferably formed of nodular iron, steel or other high-tensile strength metal, and the angle and width of conic surface 15 is preferably selected to fit the warping characteristics of the particular metal selected. As pressure plate 10 wears in and warps, ridge 14 is somewhat rounded and inner face 13 and outer face 15 are oriented for even wearing away of clutch friction material, maximum clutch life, and more nearly uniform torque.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, the inventive friction clutch pressure plate can be used in a variety of clutches and can be sized and shaped within a range of configurations according to the spirit of the invention.

I claim:

1. In a friction clutch including an annular metallic pressure plate having a pressure-face generally perpendicular to the axis of said clutch, and improvement in said pressure plate comprising:
   a. said pressure face having a plane surface extending from the inner edge of said pressure plate outward at least one-third of the way toward the outer edge of said pressure plate;
   b. said pressure face having a conic surface extending from said plane surface to said outer edge;
   c. said conic surface extending inward from said outer edge at least one-quarter of the way toward said inner edge;
   d. said conic surface being inclined rearwardly relative to the engaging direction of said pressure face; and
   e. the angle between said plane surface and said conic surface subtending 0.030 inch to 0.400 inch at said outer edge.

2. The friction clutch of claim 1 wherein said pressure plates is formed of nodular iron.

3. The friction clutch of claim 1 wherein said angle between said plane surface and said conic surface subtends approximately 0.100 inch at said outer edge.

4. The friction clutch of claim 1 wherein said conic surface extends inward from said outer edge approximately one-third of the way toward said inner edge.

5. The friction clutch of claim 4 wherein said angle between said plane surface and said conic surface subtends approximately 0.100 inch at said outer edge.

6. The friction clutch of claim 5 wherein said pressure plate is formed of nodular iron.